(12) United States Patent
Halbach

(10) Patent No.: US 6,361,221 B1
(45) Date of Patent: Mar. 26, 2002

(54) CONNECTION APPARATUS

(75) Inventor: Paul Gerhard Halbach, Wuppertal (DE)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/464,620

(22) Filed: Dec. 16, 1999

(30) Foreign Application Priority Data

Jan. 7, 1999 (DE) .......................................... 199 00 293

(51) Int. Cl.[7] ................................................. G02B 6/36
(52) U.S. Cl. ............................. 385/88; 385/89; 385/90; 385/91; 385/92
(58) Field of Search ............................. 385/88, 89, 90, 385/91, 92, 93, 94, 81, 62, 55, 60, 70, 72, 76–78

(56) References Cited

U.S. PATENT DOCUMENTS

| | | | |
|---|---|---|---|
| 4,418,983 A | 12/1983 | Bowen et al. | 350/96.21 |
| 4,479,696 A | 10/1984 | Lubin et al. | 350/96.2 |
| 4,741,590 A | 5/1988 | Caron | 350/96.21 |
| 4,758,719 A | 7/1988 | Sasaki et al. | 250/227 |
| 5,015,060 A | * 5/1991 | Tamagno et al. | 350/96.2 |
| 5,276,752 A | * 1/1994 | Gugelmeyer et al. | 385/69 |
| 6,174,091 B1 | * 1/2001 | Herrmann | 385/81 |

FOREIGN PATENT DOCUMENTS

DE    3243309 C2    7/1986

* cited by examiner

*Primary Examiner*—Mohammad Sikder
(74) *Attorney, Agent, or Firm*—Thomas A. Twomey

(57) ABSTRACT

Apparatus for the connection of an optical fibre via its end, which is provided with a connection piece (1), to an electro-optical or opto-electrical converter (2) having a housing (3), an optical lens (16) which is inserted in the housing and is accessible with one side from the outside, an apparatus for the conversion of light into electrical signals or vice versa which is arranged in the housing (3) and an electrical signal output (5), with, for the improvement of the performance of the system, in particular for the reduction of the damping at the connection point, mechanical connection means (8, 12) being moulded at the converter housing (3) through which an optical fibre can be secured at the converter housing (3) with its end surface lying opposite to the optical lens (16).

12 Claims, 2 Drawing Sheets

CONNECTION APPARATUS

TECHNICAL FIELD

Figure 1:
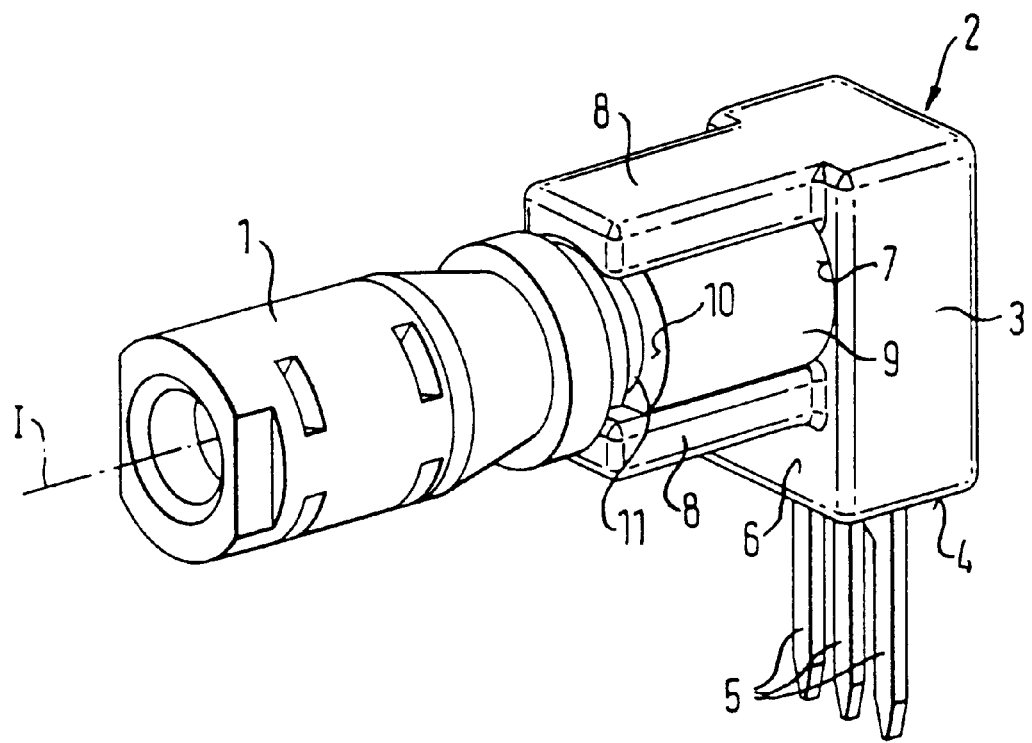

The present invention relates to an apparatus for the connection of an optical fibre via its end, which is provided with a connection piece, to an electro-optical or opto-electrical converter having a housing, an optical lens which is inserted in the housing and which is accessible from the outside, a device for the conversion of light into electrical signals or vice versa which is arranged in the housing and an electrical signal output.

BACKGROUND OF THE INVENTION

At their ends, optical fibres must be connected to an electro-optical or opto-electrical converter in which the electrical signals are converted into optical signals or the optical signals are converted into electrical signals respectively. In order to achieve a high performance capability of the system, in particular a low damping, the end surface of the optical fibre must be brought as close as possible to the optical lens of the converter and fixed in this position. In this the tolerance should also be as low as possible.

SUMMARY OF THE INVENTION

The object of the invention is to provide a connection apparatus of the initially named kind which enables a high performance of the system, in particular a low damping at the connection point between the optical fibre and the converter.

This object is satisfied in that mechanical connection means are moulded at the converter housing through which an optical fibre can be secured at the converter housing with its end surface lying opposite to the optical lens.

Through the moulding of the mechanical connection means at the converter housing there exists a direct connection between the connection piece of the optical fibre and the converter. The tolerances are thereby reduced. The damping through the interface is correspondingly low and the performance of the system is increased.

In accordance with an embodiment of the invention, at the connection piece of the optical fibre an end section which is adjacent to the end surface is provided which is bounded at the other side by a shoulder which is provided between the end section and a thereto adjoining contracted section of the connection piece and which can be engaged behind by securing means which are attached at the converter housing. Through this a reliable securing is achieved in a constructionally uncomplicated and inexpensive way.

In accordance with a further embodiment of the invention, claws are moulded at the converter housing as securing means, which are arranged laterally to the optical lens and project from the housing. Through this solution a reliable securing is achieved without additional means.

For achieving a simple assembly the claws can be elastically spread apart by the end section of the connection piece. The claws thereby automatically latch into the shoulder of the connection piece and secure the latter at the converter housing.

In accordance with a further embodiment of the invention a bow is provided as a securing means which can be inserted with its two ends in each case into a mount which is moulded at the converter housing and which bow is designed to engage behind the shoulder of the connection piece. Together with the mounts which are provided at the housing the bow again forms a constructionally uncomplicated and inexpensive and reliable securing.

The two limbs of the bow are preferably designed to be elastically movable with respect to one another. The bow thereby latches automatically in the shoulder of the connection piece and secures the latter at the housing.

In accordance with a further embodiment of the invention the shoulder is designed as an inclined surface, with the claws or the limbs of the bow being bias tensioned against the inclined surface when the connection piece is inserted. Through this embodiment the connection piece is moved towards the lens when the claws or the limbs of the bow come to lie in contact at the shoulder. The tolerance is hereby further reduced and the performance capability of the system is correspondingly increased without additional elements being necessary. In particular no additional element is required for the tolerance compensation. The angle of inclination of the shoulder preferably amounts to approximately 45°.

BRIEF DESCRIPTION OF THE PREFERRED EMBODIMENT

Figure 2:
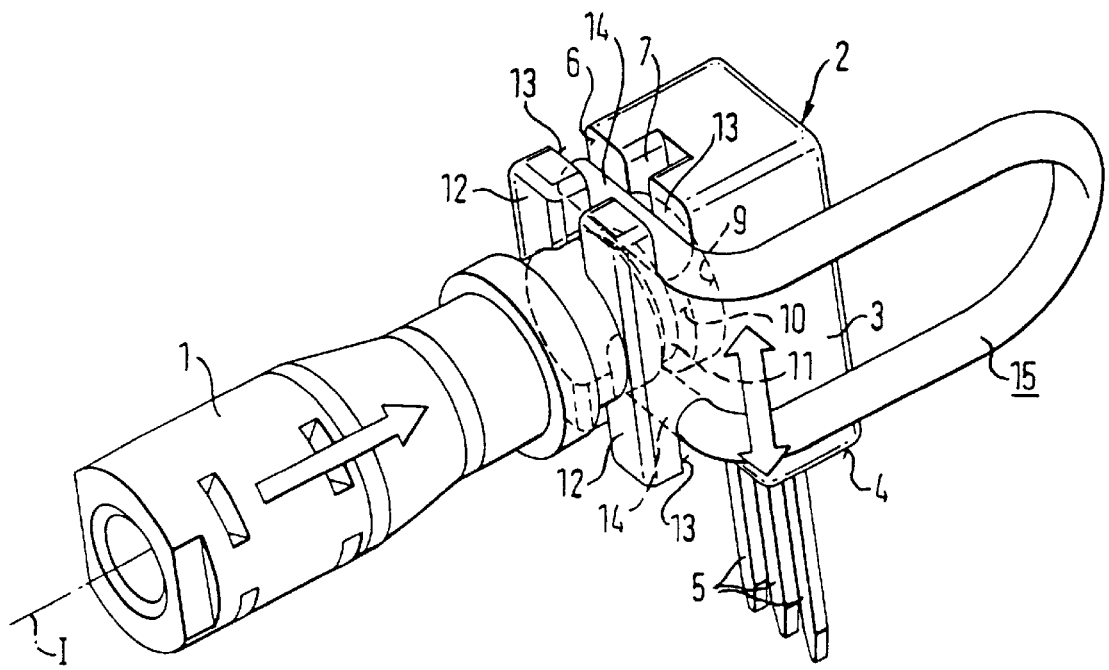
Figure 3:
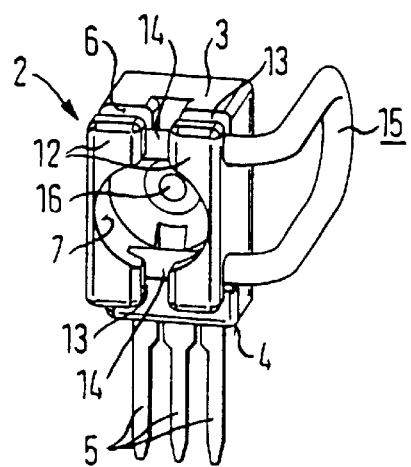

The present invention will now be described, by way of example, with reference to the accompanying drawings, in which:

FIG. 1 is a first variant of the connection apparatus in accordance with the invention in a perspective view, FIG. 2 is a second variant of the connection apparatus in accordance with the invention in a perspective view and FIG. 3 is the variant of FIG. 2 without inserted connection piece, likewise in a perspective view.

DESCRIPTION OF THE PREFERRED EMBODIMENT

A non-illustrated optical fibre is provided at its end with a connection piece 1 which is connected to an electro-optical or opto-electrical converter 2. The converter 2 comprises a housing 3 in which the converter devices are provided. The housing 3 is provided with electrical connection contacts 5 at a narrow side 4. The housing 3 has an input opening 7 for the connection piece 1 at a broad side 6. An optical lens, which is not illustrated here, and at which the end side of the connection piece 1 lies in contact, is provided in the input opening 7.

Two claw-like extensions 8 are moulded laterally to the input opening 7 at the housing 3 of the converter 2 and project from the housing 3 at the broad side of the latter. The connection piece 1 is provided with an end section 9 which fits between the claws 8 and which is bounded at its side facing away from the end surface of the connection piece 1 by a shoulder 10 which is provided between the end section 9 and a thereto adjoining contracted section 11 of the connection piece 1. The shoulder 10 has an angle of inclination of approximately 45° with respect to the longitudinal axis I of the connection piece 1.

The shoulder 10 is engaged behind by the two claws 8 of the housing 3, with the claws 8 being spreadable apart and having corresponding countersurfaces to the shoulder 10 which are designed in such a manner that the claws 8 are tensioned against the shoulder 10. The inserted connection piece 1 is thus moved by the resilient claws 8 towards the housing 3. Through this the end surface of the connection piece 1 is held in close contact with the optical lens in the housing 3 and the tolerance is reduced. In all there thus results a firm and high-performance connection between the optical fibre and the converter 2.

The variant illustrated in FIG. 2 likewise comprises a connection piece 1 which is arranged at the end of a non-illustrated optical fibre and an electro-optical or an opto-electrical converter 2. The converter 2 again comprises a housing 3 which is provided at a narrow side 4 with electrical connection contacts 5. At a broad side 6 the housing 3 has an input opening 7 to the optical lens which can no more be recognised in the illustration of FIG. 2 than can the converter devices in the interior of the housing 3.

Furthermore, flanges 12 are moulded at the broad side 6 of the housing 3 in which mounts 13 are provided in which in each case a limb 14 of a spring bow 15 can be inserted. In this the flanges 12 project from the housing 3 laterally to the input opening 7, whereas the mounts 13 are introduced parallel to the broad side 6 in each case at both sides in the flanges 12. Accordingly, the two limbs 14 of the spring bow 15 can engage at both sides into the mounts 13 and move counter to one another parallel to the broad side 6 of the housing 3.

The connection piece 1 also has an end section 9 in the second variant which is bounded at its side facing away from the end surface of the connection piece 1 by a shoulder 10 which is formed between the end section 9 and a thereto adjoining, contracted section 11 of the connection piece 1. Here as well the shoulder 10 has an angle of approximately 45° with respect to the longitudinal axis I of the connection piece 1.

The end section 9, shoulder 10 and section 11 of the connection piece 1 are designed in such a manner that the limbs 14 of the spring bow 15 are spread apart when the connection piece 1 is inserted and are elastically tensioned against the shoulder 11. Through this the connection piece 1 is again moved towards the optical lens 16—see FIG. 3—and achieves a firm lying in contact at a low distance and with low tolerance. This variant is also distinguished through high performance capability with low damping at the interface.

What is claimed is:

1. Apparatus for the connection of an optical fibre via its end, which is provided with a connection piece (1), to a converter (2) having a housing (3), an optical lens (16) which is inserted in the housing and is accessible with one side from the outside, an apparatus for the conversion between light and electrical signals which is arranged in the housing (3) and an electrical signal output (5), characterised in that mechanical connection means (8, 12) are moulded at the converter housing (3) through which an optical fibre can be secured at the converter housing (3) with its end surface lying opposite to the optical lens (16).

2. Connection apparatus in accordance with claim 1, characterised in that at the connection piece (1) of the optical fibre an end section (9) is provided which is bounded at the other side by a shoulder (10) which is provided between the end section (9) and a thereto adjoining, contracted section (11) of the connection piece (1) and which can be engaged behind by the securing means (8, 14) which are attached at the converter housing (3).

3. Connection apparatus in accordance with claim 2, characterised in that claws (8) are moulded as securing means at the converter housing (3), which are arranged laterally to the optical lens and project from the housing (3).

4. Connection apparatus in accordance with claim 3, characterised in that the claws (8) can be elastically spread open by the end section (9) of the connection piece (1).

5. Connection apparatus in accordance with claim 2, characterised in that a bow (15) is provided as a securing means which with its two limbs (14) can in each case be inserted into a mount (13) which is moulded at the converter housing (3) and which is designed for the engaging behind the shoulder (10) of the connection piece (1).

6. Connection apparatus in accordance with claim 5, characterised in that the two limbs (14) of the bow (15) are elastically movable with respect to one another.

7. Connection apparatus in accordance with one of the claims 2 to 6, characterised in that the shoulder (10) is designed as an inclined surface; and in that the securing means (8, 14) are tensioned against the inclined surface of the shoulder (10) when the connection piece (1) is inserted.

8. Connection apparatus in accordance with claim 7, characterised in that the inclined surface has an angle of approximately 45° with respect to the longitudinal axis (I) of the connection piece (1).

9. Connection apparatus in accordance with one of the claims 5 or 6, characterized in that the shoulder (10) is designed as an inclined surface; and in that the limbs (14) of the bow (15) are tensioned against the inclined surface of the shoulder (10) when the connection piece (1) is inserted.

10. Connection apparatus in accordance with claim 9, characterized in that the inclined surface has an angle of approximately 45° with respect to the longitudinal axis (I) of the connection piece (1).

11. Connection apparatus in accordance with one of claims 3 or 4, characterized in that the shoulder (10) is designed as an inclined surface; and that the claws (8) are turned against the individual surface of the shoulder (10) when the connection piece (1) is inserted.

12. Connecting apparatus in accordance with claim 11, characterized in that the inclined surface has an angel at approximately 45° with respect to the longitudinal axis (I) of the connection piece (1).

* * * * *